Sept. 6, 1955 R. O. LUNDBERG 2,716,908
AUTOMATIC GRINDER FOR CIRCULAR SAWS
Filed July 19, 1954 3 Sheets-Sheet 1
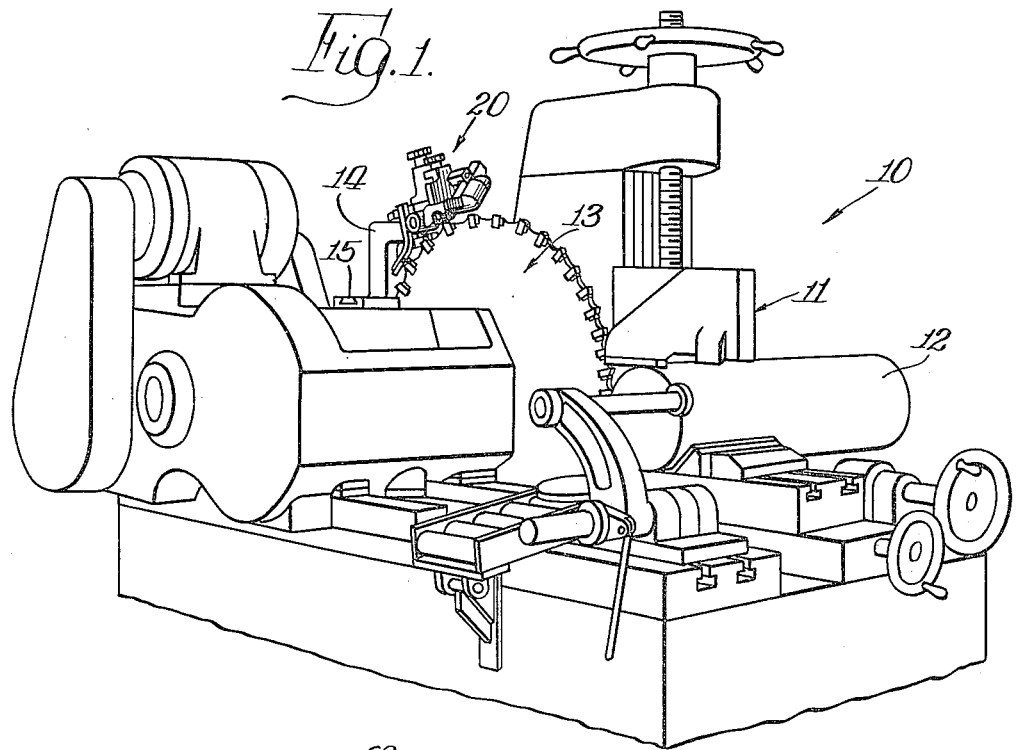
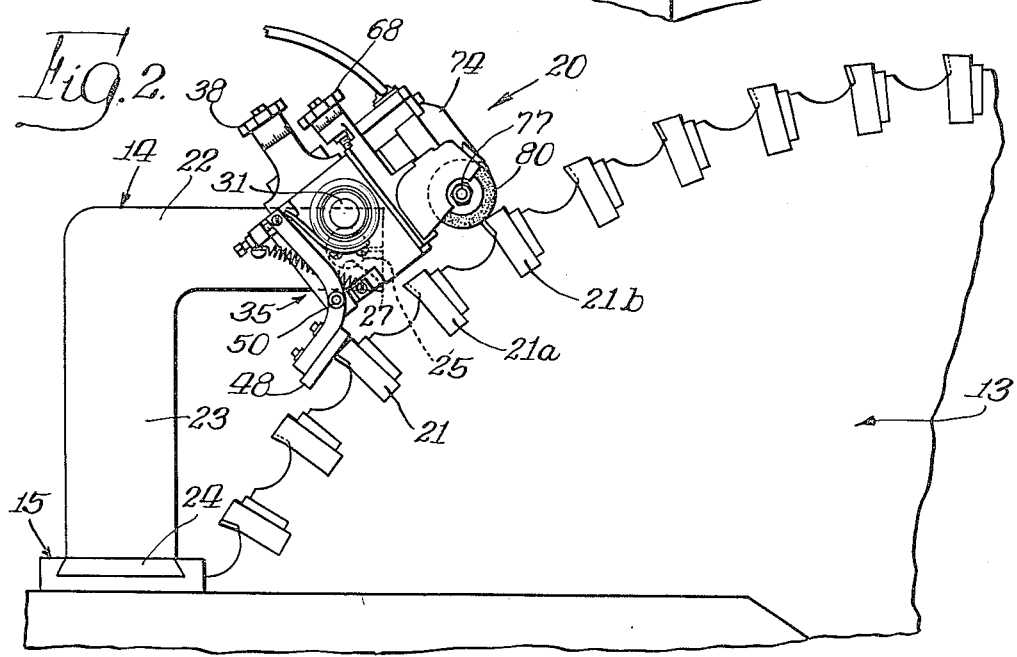
INVENTOR.
Roland O. Lundberg
BY
Attys.

Sept. 6, 1955                    R. O. LUNDBERG                    2,716,908
                        AUTOMATIC GRINDER FOR CIRCULAR SAWS
Filed July 19, 1954                                        3 Sheets-Sheet 2
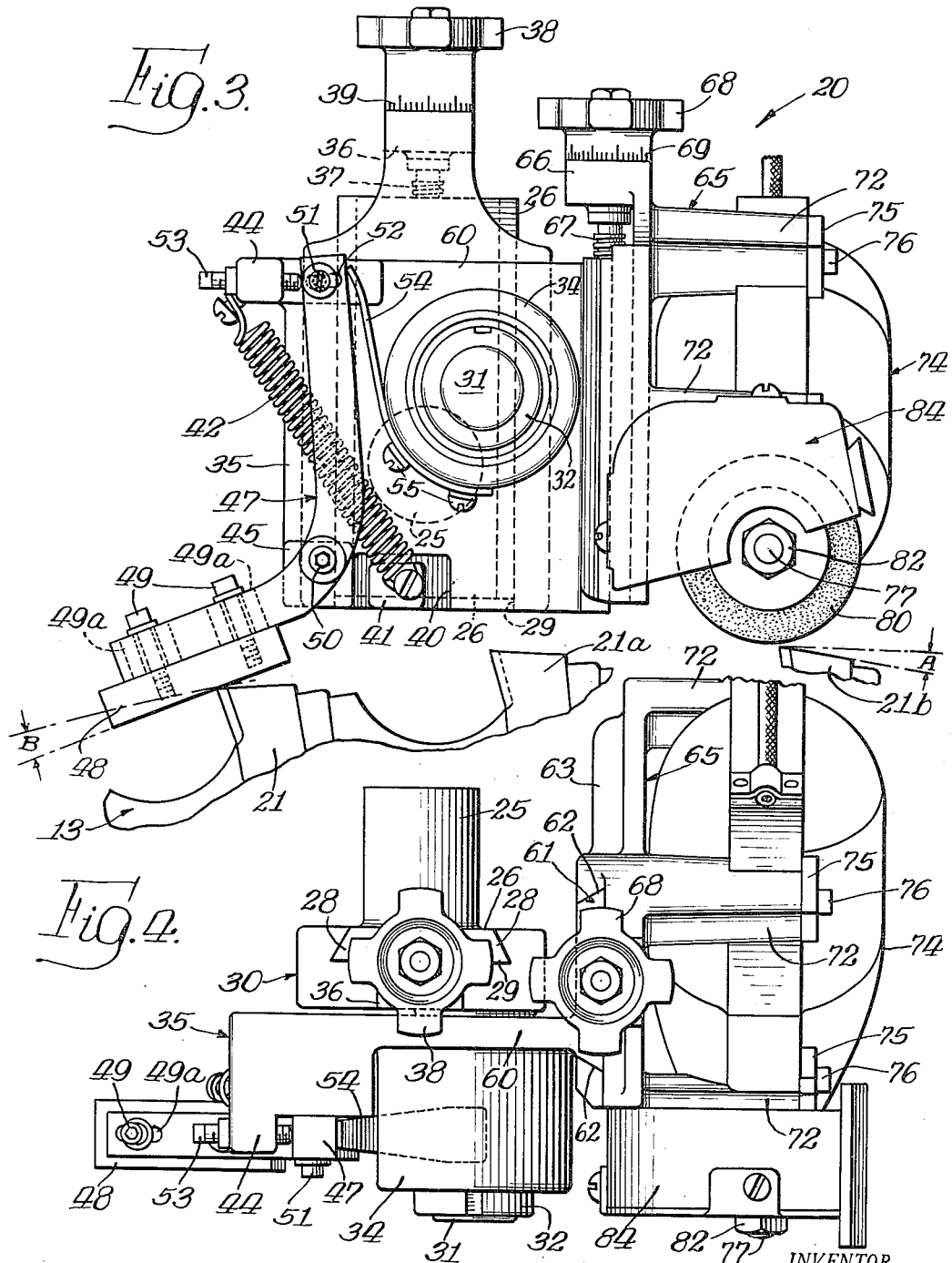

Sept. 6, 1955  R. O. LUNDBERG  2,716,908
AUTOMATIC GRINDER FOR CIRCULAR SAWS
Filed July 19, 1954  3 Sheets-Sheet 3
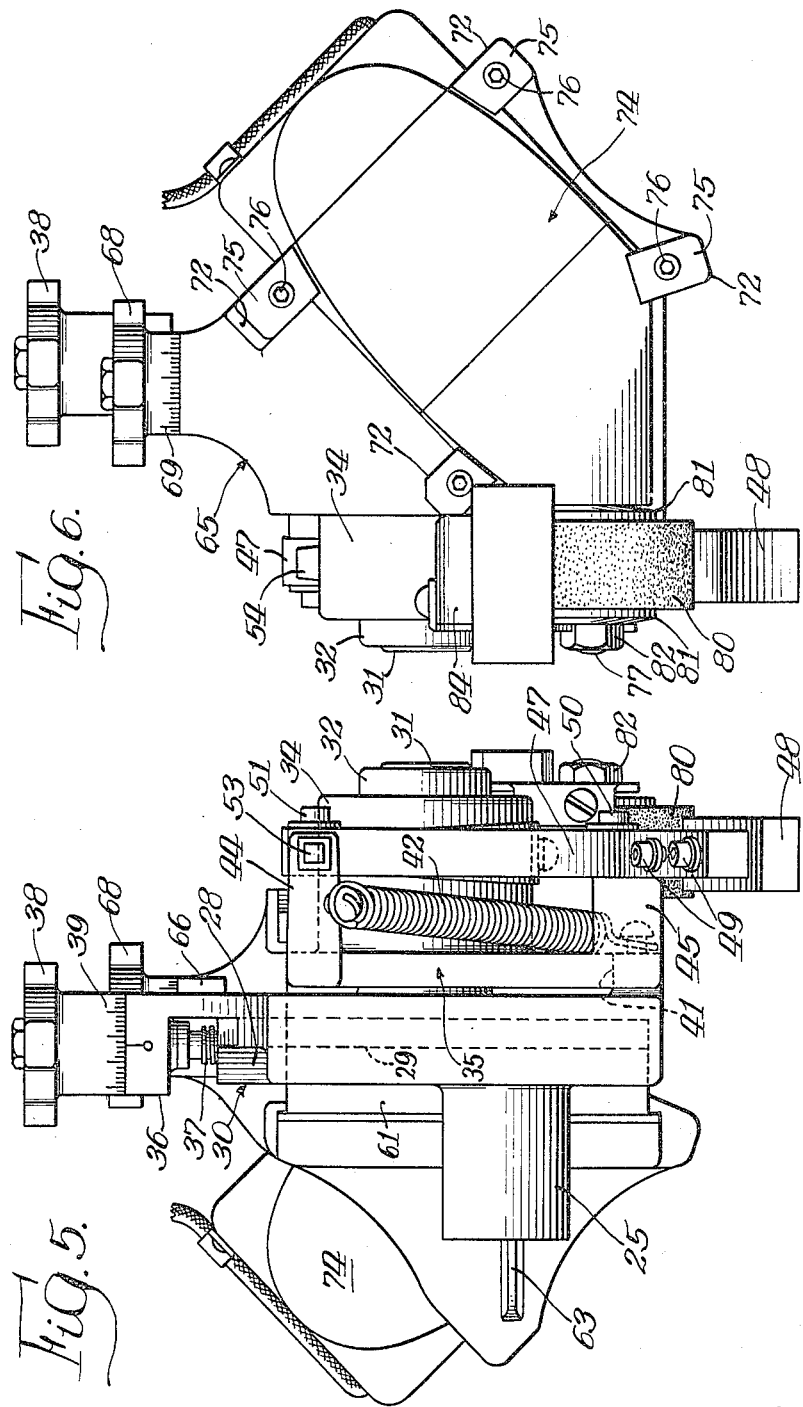
INVENTOR.
Roland O. Lundberg,
BY
ATTYS

United States Patent Office 2,716,908
Patented Sept. 6, 1955

2,716,908

AUTOMATIC GRINDER FOR CIRCULAR SAWS

Roland O. Lundberg, Lincolnwood, Ill.

Application July 19, 1954, Serial No. 444,104

7 Claims. (Cl. 76—40)

This invention relates generally to devices for sharpening saw blades and has to do in particular with an apparatus for sharpening the teeth of large circular saws.

Under present practice, steel billets and metal bar stock are sawed with great accuracy in improved circular sawing machines which are designed and built to accommodate the use of saw blades of rather extensive diameter, for example in the order of 80 to 120 inches. The preferred form of saw blade to which the invention herein has particular adaptation comprises a type in which the individual cutting members of the blade are removable tool bits or tooth members. In the art of metal cutting with such circular cut-off saws, the individual tool bits are subject to extreme wear and heat which leads to the eventual breakdown of their cutting edges. By present methods the saw blades are usually removed from the cutting machine and the individual tool bits or tooth members thereon sharpened at a remote station, the machine being supplied with a spare blade meanwhile. The removal of a saw blade of the order referred to from a cutting machine involves a time consuming operation which is not only expensive but also results in a marked loss of production time for the cut-off machine. In some instances the individual tool bits or tooth members are removed for individual sharpening and then replaced in the saw blade proper which embodies means for carrying such bits. This operation is even more time consuming than the removal of the entire blade and sharpening of the tool bits while still mounted on the blade. This latter method also gives rise to inaccuracies of alignment for the various and multiple tool bits which further compounds the cost of reconditioning a saw blade of this class.

Briefly, the invention herein disclosed, is directed to the proposition of sharpening the tool bits while the same remain in their mounted condition on the saw blade and while the saw blade is maintained in its normal operating position on the cutting machine. The device is of a character and nature to facilitate quick and accurate grinding or sharpening of the saw teeth.

One of the outstanding features of my improved sharpening device is found in the provision of an improved guide means thereon which employs each saw tooth as a cam or guide for determining the extent of sharpening a succeeding saw tooth. By this means the finished reconditioned saw blade is accurate in radial dimension or that is, has the teeth thereon uniformly sharpened which therefore leads to greater economies and speed of production while avoiding the heretofore experienced problems found in the present practice of sharpening the blades at a station remote from the arbor of the cutting machine. The advantage of sharpening the blade directly on the arbor of the cutting machine instead of removing it from the cutting machine, lies chiefly in the aligning of the saw tooth cutting edges at uniform radial distance with respect to the rotational axis of the blade and further in the marked reduction of sharpening time and the avoidance of blade handling time.

The main object of this invention is to provide a new and improved device for sharpening large circular saw blades of the order utilized in the cutting of metal billets and like weighty metal articles.

A further object of this invention is to provide a new and improved circular saw sharpening device or grinder which embodies principles and structures to enable accurate and uniform sharpening of the individual teeth of the blade.

A still further object of this invention is to provide a new and improved sharpening device for large circular metal cutting saw blades in which each tooth serves as a guide for locating and aligning the sharpening device during its operation on a succeeding tooth of the saw blade; the result being a uniform sharpening of the several teeth of the blade.

The above and further objects, features and advantages of this invention will become apparent to those familiar with the art from the following detailed description of its features and will be particularly understandable with reference to the illustration of a preferred embodiment thereof as found in the accompanying drawings.

In the drawings:

Figure 1 is a perspective showing of a typical circular saw cut-off machine showing the mounted relation of my improved sharpening device therewith;

Figure 2 is a partial enlarged side elevational view of a portion of the saw utilized in the machine of Figure 1 and showing the operational positioning of my improved sharpening device with respect thereto;

Figure 3 is a side elevational view, similar to Figure 2, showing the improved sharpening device of this invention at an enlarged scale thereover;

Figure 4 is a top plan view of the sharpening device illustrated in Figure 3;

Figure 5 is a rear end elevational view of the device illustrated in Figure 3; and Figure 6 is a front end elevational view of the sharpening device shown in Figure 3.

Turning now to the features of my improved device as illustrated in the drawings, from Figure 1 it will be seen that I have illustrated the same in association with a large stock circular cut-off machine, indicated generally by numeral 10. Briefly, the cut-off machine 10 comprises a gripper arrangement 11 designed to engage and tightly hold a large billet of raw metal stock shown at 12. Power means and suitable driving connections are associated with a large circular saw blade 13 which is advanced through the axis of the billet 12 to effect an accurate and smoothly milled cut-off of the stock. Located in overhead adjacency to the periphery of the saw blade 13 on a support bracket member 14 and arranged to move along a key way member 15, is the improved sharpening device of this invention indicated generally by numeral 20. The exact positioning of the sharpening device 20 on the cut-off machine is of little consequence so long as the bracket means 14 is located in a position adequate to give the operator freedom of use of my device and to provide sufficient room for the selective movement of the sharpener sideways of the plane of saw blade 13. This is all by way of saying that the preferred mode of operating my device and associating it with a cut-off machine is to locate the same in a position relative to the saw blade such that the grinding elements or sharpening portions of the device may be selectively moved into position to engage the extreme peripheral edge of the individual teeth of the saw blade.

The above brief description of the general aspects of my invention will be more understandable with reference particularly to Figure 2 of the drawings, wherein an enlarged view of the particular section of the cut-off machine 10 relating to my improved sharpening device 20 and its relation to saw blade 13 is illustrated. As will be recognized, the saw blade 13 illustrated is of the type employing removable individual tool bits 21, 21a, 21b, etc. which constitute the cutting teeth for the saw and define the peripheral boundaries thereof. Basically, the sharpening device 20 is held adjacent the extreme end of an arm portion 22 forming a part of the bracket means 14. A downwardly extending leg portion 23 related in rectangular fashion to arm portion 22 is formed with a slide plate lower end portion 24 which is designed to snugly engage or fit slidingly within a mating key way formed in the key way member 15 mounted by bolt means or other like fasteners (not illustrated) to a suitable portion of the housing or structure of the cut-off machine 10. The key way member 15 is of sufficient length to permit sliding motion of the entire bracket means 14 therealong so that the sharpening device 20 may be removed laterally with respect to the plane of saw blade 13 when not being employed for its sharpening function.

Turning now to the particular features which constitute the improvements of this invention as found in the embodiment of the device 20 illustrated, reference should now be had to Figures 3, 4, 5 and 6 of the drawings. From Figures 3 and 4, it will be recognized that the device 20 is arranged for mounting on the mounting arm 22 of bracket means 14 by inserting a cylindrical hub 25 projecting integrally from a vertically disposed slide shoe member 26. Hub 25 fits into an opening 27, as indicated by dotted lines in Figure 3, which is formed through the mounting arm 14. Suitable means are provided on the mounting arm 14 for gripping the hub member 25 to the end that the two members may thus be rigidly innerconnected, but removably so for purposes of disassociating the sharpening device 20 from the mounting bracket 14, if desired.

As seen best in Figure 4 of the drawings, the shoe member 26 is formed with angularly related side walls 28—28 forming a key which is slidingly received in a dove-tail key way 29 formed in a vertically disposed adjustment plate member 30. The plate member 30 is formed with a cylindrical stud axle projection 31 which extends outwardly from the opposite side thereof from that which includes the key way means 29. The longitudinal axis of the stud axle 31 is offset with respect to the longitudinal axis of the hub member 25 (see Figure 3), so that there is an offset relationship between the pivotal axis for the sharpening device 20 as provided and formulated by stud axle 31 and the axis upon which the same device is connected to the mounting arm means 14. Axle 31 is carried in a bearing collar means 32 which is housed in a cylindrical boss portion 34 associated with a main body casting 35 of the grinder device 20.

The adjustment plate 30 is provided with a laterally extending ear portion 36 adjacent its upper end through which is rotatably inserted an adjustment screw 37 supporting an operating knob 38 at its upper end and threadingly connected to the slide shoe 26 at its lower end. It will therefore be appreciated that turning of the adjustment knob 38, which incidentally bears a micrometer adjustment scale 39 about its circumference which cooperates with an index marking formed on the ear projection 36, will result in a graduated lowering or raising of the adjustment plate 30 with respect to slide shoe 26 thereby serving to elevate or depress the entire body casting with respect to the axis of the mounting hub member 25. This adjustment gives a wide range for varying the vertical positioning of the sharpening device with respect to the periphery of the saw blade, as will be explained in greater detail presently hereinafter.

The main body casting 35 is provided with a cut-out opening 40 of substantially rectangular contour located adjacent its lower end, as seen best in Figure 3. The adjustment plate 30 is provided with a projecting lug 41 which enters the opening 40 of the body member 35 when the two members are in their assembled relation. The presence of the lug in opening 40 provides a stop means for limiting the arcuate throw or rocking movement of the main body casting with respect to the adjustment plate 30 as permitted by the presence of the hub axle 31 defining its pivotal axis. It will also be appreciated that a spring means 42 is employed extending between the lug 41 and a projecting finger 44 formed at the upper left-hand corner of the main body casting, as illustrated in Figure 3. This spring member serves to normally bias the body 35 counterclockwise about the pivotal axis provided by hub member 31. A limit to such counterclockwise rotation of the device is effected by the engagement of lug 41 which the adjacent periphery of opening 40.

Formed in outward projecting fashion immediately alongside the opening 40 on the main body casting is a secondary finger portion 45 for mounting a dog-leg guide arm 47 having a guide plate 48 disposed at its lower end. The guide plate 48 is connected or joined to the guide arm 47 by bolt means 49—49 which extend through slotted or corresponding pairs of multiple openings 49a formed in the arm 47 for threading engagement at their lower ends with the guide plate 48. The provision of the slotted or multiple openings 49a through which the bolt members 49 extend provides a means for adjusting the position of the guide shoe or plate 48 with respect to the arm 47. Arm 47 is joined to the finger portion 45 by a single pivotal bolt means 50 while a similar bolt means 51 is provided adjacent the upper end of such arm 47 for connecting it with the body casting 35. Note, however, that bolt 51 passes through arm 47 for threading connection with the body member 35 via a slotted aperture 52 formed in the arm member 47. Immediately adjacent and extending into contact with arm 47 is an adjustment bolt 53 which threadingly passes through the finger portion 44. Threading adjustment of the bolt 53 after loosening the bolts 51 and 50 permits pivotal adjustment of the guide arm 47 about an axis defined by bolt 50. A leaf spring 54 is joined by screw means 55 to the exterior of the boss portion 34; such spring engaging the upper end of the guide arm 47 substantially opposite the axis of the adjustment bolt 53 thereby to normally bias said arm toward and into compressive engagement with the adjacent end of the adjustment bolt 53.

With regard now, in greater particular, to the features of the main body casting 35, it will be noted from Figures 4 and 5 in particular, that the boss portion 34 thereof formed integrally in projecting fashion from a main wall portion 60 at one end of which is formed, in transverse manner, a key plate 61. Plate 61 is constructed with sloping side walls 62—62 which slidingly engage with a slotted key way of a dove-tail formation (similar to key way 29 previously described) formed in a rear wall portion 63 of a motor mounting bracket 65. As in the interlocking connection between the adjustment plate 30 and the slide shoe 26, a similar sliding key way connection is thus provided between the main body casting 35 and the motor mounting bracket 65 so that the motor mounting bracket is vertically adjustable with respect to the main body casting 35. In order to provide a convenient means of adjusting the vertical disposition of the motor mounting bracket, its rear wall 63 is provided or formed with an extending ear portion 66 through which an adjustment screw 67 extends. An operating knob 68 having an index scale 69 is mounted at the upper end of the screw 67 which threads into and out of the key plate 61. It will be recognized that the operating knob 68 and adjustment screw 67 closely parallel and correspond to the adjustment means 38 and 37 heretofore described. Since the adjustment screw 67 is threadingly received in the upper end of the key plate 61, elevation or depression of the motor mounting bracket with respect to main body casting may be conveniently carried out as desired.

The motor mounting bracket as seen from Figures 3, 4, 5 and 6, includes in addition to the rear wall portion 63 containing the key way means for key plate 61, four spaced arm members 72—72. Such arm members are spaced suitably to embrace an electrical drive motor 74; the motor being held in position between the arms 72 by means of connector plate means 75—75 held on the ends of the arm members 72 by bolt members 76. The motor member 74 rests at substantially an incline between the several arm members 72—72 and is provided with a drive shaft 77 which is disposed substantially horizontally and is therefore offset angularly with respect to the main longitudinal axis of the motor. The shaft 77 mounts a grinding wheel 80 which is held in place between washers 81—81 by means of a mounting nut 82. In order to avoid mishap from the chance breaking of the grinder wheel a suitable protective housing or shield 84 is disposed over the upper portions of the wheel 80. It will be appreciated that in addition to the vertical adjustment of the motor mounting bracket 65 as provided by the adjustment screw means 67, the motor itself may be adjusted along its incline to align wheel 80 with the guide member 48 by loosening of the several holding bolts 76, so that the motor may be moved relative to the arms 72. By-in-large, however, the provision of the adjustment screw means 67 is sufficient to meet ordinary operational conditions as far as the vertical adjustment of the wheel disposition is concerned.

From the above description of the several elements and portions of my device which make up the improvement of this invention, it will be appreciated that basically the same comprises a suitable body or bracket member which is pivotal about substantially a central axis as defined by the axle member 31. At one end of the bracket (the main body member 35) is disposed a grinding wheel 80 which is motorized as by means of the motor 74; the grinding wheel being located in a plane of the guide plate means 48 disposed on the opposite side of the pivotal axis 31. Adjustment of the arcuate disposition of the contacting faces for shoe 48 and wheel 80 is permitted by the vertical adjustment of the means 30 indirectly supporting the shoe member 48 as well as the vertical adjustment of the grinding wheel 80. Likewise, the arm means 47 carrying the shoe member 48 is pivotally adjustable, as explained, to permit proper alignment of the shoe or guide plate.

With regard to the pivotal adjustment of the guide arms 47, it should be noted that this provision is made in order for the guide plate 48 to be disposed in an angular disposition substantially reversed in slope of the clearance angle A for the saw teeth. In the particular embodiment illustrated, the distance from the point of initial contact of the guide shoe 48 with tooth 21 to the center of the pivotal axis 31 is equal to the distance from such axis to the leading edge or high point of the succeeding tooth contacted by the grinding wheel 80 (for example tooth 21b). As a result of this particular geometric relationship, it is obvious that in order for the grinding wheel 80 to follow the clearance angle or slope of the outer face for tooth 21b, it is essential that the guide shoe 48 be disposed in an opposite angular relationship with respect to the leading edge of tooth 21 with which it is in contact. Since the teeth act as a guide or cam means for automatically elevating the guide shoe to cause a corresponding lowering of the grinding wheel 80 through the somewhat bell-crank type linkage connection between shoe 48 and wheel 80, it necessarily follows that the angular positioning of shoe 48 as measured by angle B is necessarily equal to the clearance angle A for the individual saw teeth. It is also obvious that if changes are made in the linear distances between the axis 31 and the points at which the teeth engage the guide shoe and grinding wheel, then corresponding changes in the angular disposition of shoe 48 will be necessary to cause the wheel 80 to grind according to clearance angle A.

Therefore, to understand the operation of my improved sharpening or grinding device, it is essential to contemplate that the individual teeth act as cam means for working the guide shoe 48 to automatically raise the same as they pass thereunder which, because of the bell-crank arrangement or connection of such shoe with the grinding wheel 80, causes an automatic and like depression of the grinding wheel. This feature enables the device to effectively grind the outer flat surface of the individual teeth according to and along the desired clearance angle designated A in the drawings. This process is entirely automatic and has proven to be extremely accurate and efficient in operation.

In operating the device of this class, the same is placed in substantially coplanar disposition with the plane of the saw body 13 so that the shoe member 48 and the grinding wheel 80 lie in substantially coplanar relationship directly over and bridging the width of the saw teeth. Providing the saw periphery is a true circle, the guide shoe will cause the grinding wheel to follow the peripheral contour of the saw in sharpening succeeding saw teeth according to a true circular contour; the several teeth of the saw being individually sharpened entirely across their outermost radial faces to form a sharpened cutting edge. In essence, the entire plan of operation of the device is that of a continuous pivotal rocking action as the individual teeth pass beneath the guide shoe 48; such cam action on the guide shoe serving to automatically lower the grinding wheel in accordance with the slope of the clearance angle A for the saw teeth and the angular relation of the shoe with respect to the periphery of the blade.

The presence of the tension spring means 42 opposes the raising action of the guide shoe 48 as caused by the cam action of the saw tooth acting thereon. That is to say, the normal biasing effect of spring 42 is counter-clockwise, as viewed in Figure 3, to thereby resiliently oppose the lifting of the guide shoe which occurs as saw tooth 21, for instance, moves across the under surface of plate 48. As a consequence, the lowering of the grinding wheel 80 is likewise opposed by spring 42. It will therefore be appreciated that upon completion of grinding the upper surface of each tooth, the spring means 42 serves to automatically elevate the grinding wheel to a position where it is in proper contacting alignment with the next succeeding tooth to be sharpened; this action being permitted by virtue of the fact that as the grinding wheel 80 leaves a tooth likewise the cam tooth acting under guide plate 48 moves beyond or leaves such guide plate.

It will thus be understood, that in order to sharpen a saw with my device, it is merely necessary to set the guide shoe in a proper angular disposition to effect a desired cutting of the tooth relief or clearance angle by the grinding wheel. Of course, the vertical disposition of the entire device relative to the periphery of the saw is regulated at a point where only a slight amount of metal is to be removed by each cut of the grinding wheel thereby to avoid any hogging of the individual teeth which might cause breakage of the grinding wheel or of the saw teeth themselves. With the device set up to effect the proper cutting from each of the teeth, the saw blade is then rotated at a desired R. P. M. to give the proper linear feed of the saw teeth past or into the grinding wheel. This process is repeated until all of the saw teeth have been sharpened properly, which event usually occurs when the most worn tooth of the saw has been cleaned up. Vertical adjustment of the grinding wheel, or that is, its radial lowering toward the rotational axis of the saw is necessary from time to time during the grinding operation to compensate for wear of the grinding wheel, etc.

In certain rare instances, it is possible for the saw to wear itself into an elliptical contour although such an occurrence is infrequent since the wear on individual saw teeth during the cutting operation is generally uniform so that, if a saw originally having a true circular contour is used, the circular contour is maintained because the cutting edges or points of the saw teeth normally wear down substantially uniformly during use. However, in the event of uneven wear on the saw teeth producing distortion of the saw's peripheral contour to substantially elliptical shape or the like, it is possible with my device to redress the saw to effect a genuinely true circular contour thereon after which the sharpening process outlined hereinabove may take place. To effect this operation, it is merely necessary to elevate the main body casting to a position wherein the guide shoe 48 will clear the teeth of the saw. If then the grinding wheel 80 is placed in a position to contact the leading edge of the highest tooth of the elliptically-contoured saw blade, it follows that by gradually lowering or feeding the grinding wheel radially inward of the saw's contour, eventually a true circle contour for the saw blade may be gained. Once such a circular contour is effected, then the automatic sharpening operation discussed and described hereinabove may be carried out to produce a true duplication of the circular contour at the end of the sharpening operation.

From the above it will be appreciated that the device disclosed has particular and unique advantages in treating saw blades constructed in accordance with the features of the blade disclosed in my prior United States Letters Patent No. 2,422,111, issued June 10, 1947, and entitled Cut-off Saw. It should also be pointed out that while both the blade of that patent and the one discussed herein are of the removable bit type, the improved device herein of subject may be employed with other type blades as well. Further, while the blade 13 shown is illustrated with my device bridging an intermediate tooth 21a, or that is having the shoe 48 and grinder 80 contacting teeth which are intervened by a single tooth, the device could also be constructed or the saw blade could be formed so that adjacent teeth of the blade would simultaneously engage the shoe 48 and wheel 80.

Thus, it will be recognized that I have herein disclosed and described the features of an improved grinder or sharpening device for use especially with large metal cutting circular saws; the device permitting the sharpening of the saw teeth without the removal of the saw blade from the cut-off machine. While it is recognized that numerous changes, modifications and substitutions of equivalents may be made in the device illustrated, it is felt that such will not necessarily depart from the spirit and scope of the inventive principles involved. I do not therefore wish to be limited to the particulars of the device disclosed and described, except as may appear in the following appended claims.

I claim:

1. A device for sharpening the teeth of a circular metal cutting saw blade of the class described, comprising, a mounting bracket means for slidingly supporting the device adjacent but radially outward of the blade's periphery while the blade is mounted for rotation with its supporting arbor, a main body casting pivotally supported on said mounting bracket means for limited pivotal movement about a substantially horizontal axis, a guide shoe carried by said body casting at a position beneath and to one side of the said casting's pivotal axis, a motorized grinding wheel carried by said body casting at a position beneath and to the other side of said pivotal axis; the guide shoe and the grinding wheel lying in substantially coplanar relation with the body of the saw blade to be sharpened, the device when sharpening the teeth of the blade having said guide shoe resting on the radially outermost edge of one saw tooth while said grinding wheel engages a corresponding portion of a succeeding saw tooth, and spring means pivotally biasing said body casting in a direction serving to move said shoe into engagement with the said edge of said one tooth whereby said grinding wheel is moved relative to the outer surface of a succeeding saw tooth in response to the movements of said guide shoe so that the progression of succeeding saw teeth into and past said grinding wheel by the revolution of the saw blade results in a uniform sharpening of the outermost surfaces of the saw teeth.

2. A device for sharpening the teeth of a circular metal cutting saw blade comprising, a casting defining the main body portion of the device, a guide shoe supported on said casting in depending relation therebeneath, a motorized grinding wheel supported by said casting and located therebeneath, means supporting said casting for limited pivotal movement on an axis paralleling the axis of rotation for the grinding wheel; the axis being located intermediate the guide shoe and the grinding wheel, means for supporting the device in fixed operating position radially outward of the saw blade, the device when conditioned to sharpen the teeth of the blade having the guide shoe thereof in sliding contact with the radially outermost edge of one saw tooth while the grinding wheel engages the outermost surface of a succeeding saw tooth, whereby as succeeding teeth of the saw advance into said grinding wheel the same are sharpened at uniform distances from the center of the saw blade.

3. A saw grinder of the class described, comprising, a main body casting, an adjustment plate pivotally connected to said main body casting adjacent one face thereof, a key way formed in one face of said adjustment plate, a slide shoe slidingly mounted in said key way and having means for attaching the grinder rigidly to a support arm, means for slidingly adjusting the vertical positioning of the adjustment plate relative to said shoe, a guide arm carried by said body casting in depending fashion from the latter, a guide plate mounted at the lower end of said guide arm, a motor bracket slidingly connected to said body casting, means for slidingly adjusting said motor bracket vertically with relation to said body casting, a motor carried by said motor bracket, and a grinding wheel rotatably driven by said motor, said wheel and guide plate lying substantially in the same vertical plane but on opposite sides of the pivotal axis for said body casting, to the end that when the guide plate is engaged with the radially outermost edge of one tooth of the saw blade, the grinding wheel is positioned in engagement with a succeeding tooth to be sharpened; said shoe being moved radially of the blade by movement of said tooth edge therepast to pivot said casting and move said grinding wheel with opposite radial motion so that the advancement of succeeding teeth of the saw blade into the grinding wheel results in the uniform sharpening of the radially outermost surfaces thereof.

4. A grinding device for sharpening large circular metal cutting saws of the type utilized with metal cut-off machines, comprising, a mounting bracket slidingly connected to the machine for lateral adjustment with respect to the plane of the saw blade to be sharpened, a slide shoe having a projecting hub portion for connection with the bracket, an adjustment plate having keyed connection with the slide shoe, means for slidingly adjusting the adjustment plate vertically with respect to the slide shoe, sliding intermovement of said slide shoe and adjustment plate being guided by the key way means interconnecting the same; a main body casting pivotally supported at substantially its geometric center adjacent one face of said adjusting plate, the pivotal axis for said body casting being substantially horizontal and transversely of the plane of said adjustment plate, a stop means projecting outwardly of said one face of the adjustment plate for engaging the body casting and limiting the latter's pivotal movement, a guide arm depending from said body casting, a guide shoe mounted at the lower end of said guide arm, means for pivotally adjusting the guide arm with respect to the body casting thereby to arcuately elevate and lower the guide shoe thereon, spring means connected between the adjustment plate and said body casting for normally biasing the guide shoe into engagement with the radially outermost edge of a saw tooth, a key plate portion formed on said body casting and comprising a substantially planar plate member disposed transversely to the plane of the adjustment plate, a motor mounting bracket having sliding connection with said key plate portion, means for adjusting the vertical position of the motor mounting bracket with respect to the key plate portion, an electric motor supported on the motor mounting bracket, a grinding wheel driven by said motor, the rotational axis of the grinding wheel paralleling the pivotal axis of the body casting with the grinding wheel and guide shoe lying in substantially the same vertical plane, said grinding wheel and guide shoe being located on opposite sides of the pivotal axis for the main body casting and adjusted so that the engagement of the guide shoe with the radially outermost edge of one saw tooth serves to determine the radial positioning of the grinding wheel with respect to the center of the saw blade so that the same may engage succeeding saw teeth and grind the radially outermost surface thereon.

5. A saw grinder of the class described for sharpening circular metal cutting saw blades and the like, comprising, a main body casting comprising a substantially planar wall portion and a transversely related key plate portion adapted to be disposed normally in a vertical position with the said wall portion substantially parallel to the plane of the saw blade being sharpened, an adjustment plate pivotally joined to said wall portion at substantially the geometric center of the latter, a slide shoe having sliding connection with said adjustment plate and formed with an extending hub member for engagement by a suitable support bracket for the device, means for adjustably regulating the vertical position of the said adjustment plate with respect to said slide shoe; said body casting being vertically movable with the adjustment plate, a motor bracket having keyed connection to said key plate, means for adjusting the vertical positioning of the motor bracket with respect to the key plate, a motor means carried by said motor bracket, a grinding wheel driven by said motor and disposed with its axis of rotation substantially parallel to the pivotal axis of the body casting, a guide shoe carried by said body casting in substantially coplanar relationship with the grinding wheel but located on the opposite side of said casting's pivotal axis from said grinding wheel, stop means determining arcuate limits for the pivotal movement of said body casting with respect to the adjustment plate, and spring means normally biasing said body casting and guide shoe in a direction toward the saw to be sharpened; the device being normally positioned adjacently outward of the periphery of the saw blade when in an operating position; the arrangement being such that the guide shoe is normally in contacting engagement with an outer edge of one tooth of said saw blade while the grinding wheel contacts the outer surface of a succeeding saw tooth to be sharpened whereby the guide shoe serves to actuate the grinding wheel radially with respect to the axis of rotation for the saw blade as the shoe is moved by the cutting edge of the tooth with which it is engaged.

6. In a saw grinder of the class described for sharpening the teeth of circular metal cutting saw blades, the combination comprising, a main body casting attachable to a rigid support system for operating in adjacency to the radial periphery of the blade to be sharpened, means for supporting the casting pivotally about an axis transverse to the plane of the saw blade, a guide means connected to the casting on one side of its pivotal axis, a grinding wheel supported on said casting and at a position located on the opposite side of its pivotal axis from said guide means, said guide means and grinding wheel being disposed in substantially coplanar relationship, means for pivotally adjusting the said guide means with respect to the rotational axis of the saw blade, and means for adjusting the radial positioning of said grinding wheel with respect to the rotational axis of the saw blade independently of the guide means; the arrangement being such that said guide means is normally disposed in contact with the outer peripheral edge of one tooth of said saw blade while the grinding wheel engages and sharpens a succeeding tooth of the saw blade to the end that a tooth sharpened by said grinding wheel acts as a limit means for determining the radial positioning of the guide means with respect to the rotational axis of the saw blade, the guide means in turn determining the radial disposition of the grinding wheel with respect to the axis of the saw blade so as to result in the uniform sharpening of the saw's teeth.

7. A device of the class described for sharpening the teeth of circular metal cutting saw blades and the like, comprising, in combination, a body member, means supporting said body member adjacent the periphery of a saw blade to be sharpened for pivotal movement about an axis transverse to the plane of said blade, a guide means mounted on said body member and forming one leg of a bell crank linkage system, a grinding wheel means mounted on said body member and defining generally the other leg of said bell crank linkage system, the center of rotation for such linkage system being defined at the pivotal axis of said body member, spring means normally biasing said guide means in a direction suitable for engaging such with the outer cutting edge of a saw tooth, the movement of the saw tooth past said guide means causing the latter to move radially outward whereby the grinding wheel means is accordingly moved radially inward with respect to the center of rotation for the saw blade, the spacing between said guide means and grinding wheel means being such that each is engaged with separate teeth of the said saw blade when the device is in operating position, the bell crank linkage system interconnecting said guide means and grinding wheel means causing the latter means to move in an opposite sense to the movements of said guide means, the latter of which responsively follows the periphery of the tooth with which it is engaged.

References Cited in the file of this patent

FOREIGN PATENTS 670,747     Germany _____ Jan. 26, 1939